UNITED STATES PATENT OFFICE.

SHEFFIELD D. BELLOWS, OF KELLY CORNERS, NEW YORK.

CHAIN-FASTENER.

1,395,896.  Specification of Letters Patent.  Patented Nov. 1, 1921.

Application filed February 15, 1921. Serial No. 445,198.

*To all whom it may concern:*

Be it known that I, SHEFFIELD D. BELLOWS, a citizen of the United States, residing at Kelly Corners, in the county of Delaware and State of New York, have invented certain new and useful Improvements in Chain-Fasteners, of which the following is a specification.

This invention relates to chain fasteners and more particularly is directed to a new and improved construction for positively securing the end links of a chain.

One of the objects of the invention is directed to a chain fastening construction for retaining the ends of a metallic chain, such as used on automobile wheels, for instance, to prevent slipping including provision whereby the ends of the chain may be readily locked and easily removed with facility without the necessity of tools.

A still further object of the invention is the construction of a novel and improved lever lock for coöperation with the ends or links of a metallic chain whereby the same are prevented from being separated and wherein the lock constitutes a connecting element for the respective links.

Another and very important object of the invention is the construction of a novel and improved link connecting construction which will be extremely simple in design and easily connected to the end links of a chain, very inexpensive to manufacture, positive and secure for its intended purpose, durable and highly efficient in use and otherwise conforming to the requirements of rigidity and durability necessary in constructions of this character.

Figure 1:
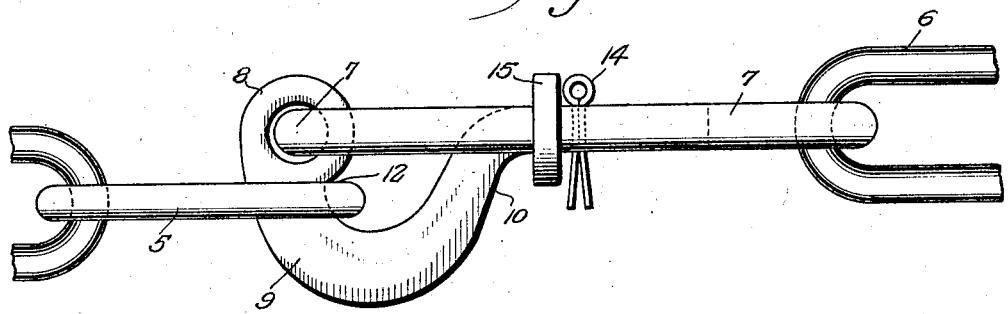
Figure 2:
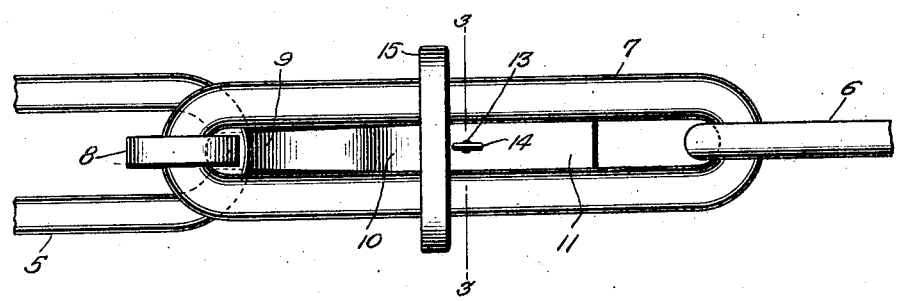
Figure 3:
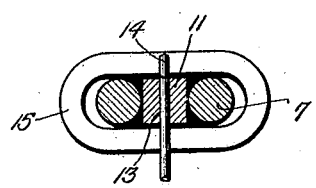

With these objects in view and others which will be manifest and suggested as the purpose and nature of my invention are revealed in the following specification and drawing wherein I have shown but one embodiment thereof, Figure 1 is a top plan view, Fig. 2 is a side view, and Fig. 3 is a view taken on the line 3—3 of Fig. 2.

Referring now to the drawings where like parts designate correspondings parts throughout the specification, the end links 5 and 6 respectively to be connected are of the usual and well known open construction such as used in connection with anti-slipping chains for automobile tires and the like. The end link 6 is connected to an elongated, enlarged closed link 7, the end 8 of said link 7 passing through an eye 8 formed in the hook portion 9 of a lever 10 which as shown has its shank portion 11 positioned between the sides of the elongated link above referred to. The hook portion 9 of the lever is provided with a recess 12 below the said eye to permit the end of the link 5 to be seated therein as clearly shown in Fig. 1.

An aperture designated by numeral 13 within the shank portion of the lever is adapted to receive a cotter pin 14 which prevents the removal of a closed, narrow, elliptical, lever retaining element 15 which prevents the removal of the shank portion 11 from the enlarged link and at all times retains the said lever in substantial parallel relation with the link of the chain when the ends thereof are in their locked position.

It will of course be understood that the retaining element 15 may be freely moved to one end of the enlarged link 7 and beyond the end of the shank portion 11 of the lever after the cotter pin has been removed so that the lever may be swung outwardly and be released from the end link 5 of the chain. The lever and the closed element 15 are at all times carried by the elongated link 7 thereby preventing the possible loss of the same, both of these elements being retained in their normal, operative position by the single cotter pin 14 above referred to and as clearly shown in Fig. 1 of the drawing. It will be quite apparent that the direct pull in the opposite direction on the links 5 and 6 will be exerted on the lever which of course is prevented from being removed by the closed element 15 retained on the shank 11 by the cotter pin.

While I have referred to the lever and elongated link 7 as applied to anti-skid chains or devices for automobile wheels, it will be readily apparent that the same is equally adapted for other uses as will be readily understood. In view of the clear and detailed drawings and the simplicity of the construction as above referred to, a further and more extended description is thought unnecessary.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It will be furthermore understood that the invention is not necessarily limited or restricted to the precise elements shown except in so far as such limitations are specified in the subject matter being claimed.

Having shown and described my invention, what I now claim as new and desire to secure by Letters Patent of the U. S. is:—

A chain lock comprising a hook or clevis having a straight shank and provided with an attaching eye and a link engaging recess below said eye, an enlarged link connected to the attaching eye of the clevis, a transverse, closed link slidably carried by the elongated link for retaining the shank of the clevis within and between the arms of said enlarged link in the same plane with the attaching eye, and a cotter pin passing through the shank for preventing relative movement of the slidable member and shank when the hook is in its operative, locking position.

In testimony whereof, I affix my signature hereto.

SHEFFIELD D. BELLOWS.